April 21, 1953     J. H. PFEIFFER     2,635,779
STORAGE APPARATUS
Filed June 2, 1949             2 SHEETS—SHEET 1
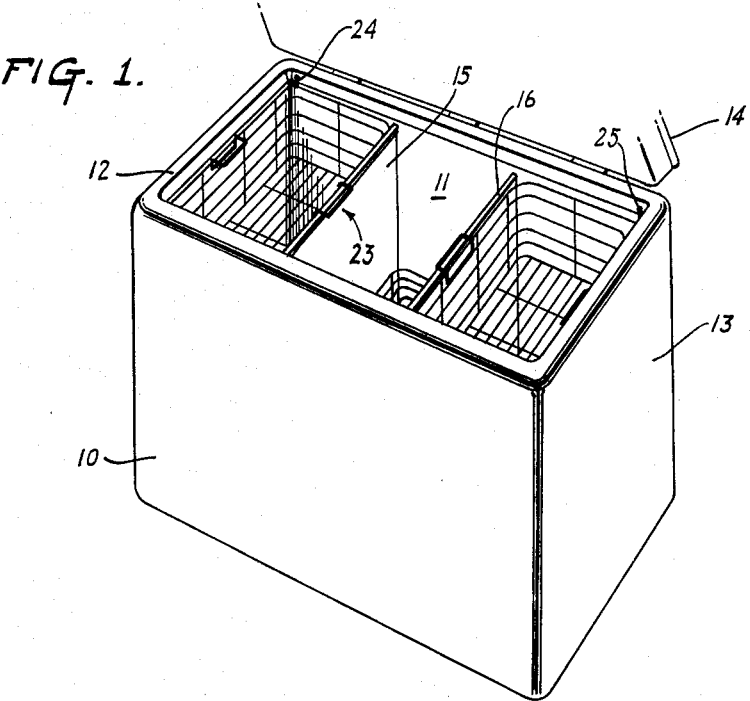
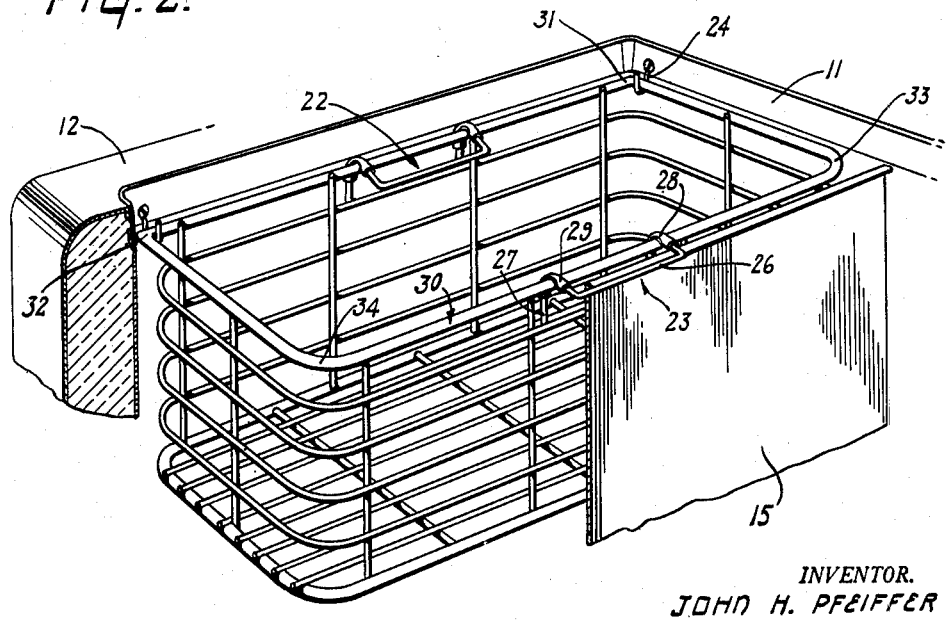
INVENTOR.
JOHN H. PFEIFFER
BY
Brown, Denk & Lynnestvedt
AGENTS April 21, 1953 J. H. PFEIFFER 2,635,779
STORAGE APPARATUS Filed June 2, 1949 2 SHEETS—SHEET 2

INVENTOR.
JOHN H. PFEIFFER
BY
Brown, Jenk & Lynnestvedt
AGENTS

Patented Apr. 21, 1953

2,635,779

UNITED STATES PATENT OFFICE 2,635,779

STORAGE APPARATUS

John H. Pfeiffer, Ambler, Pa., assignor to Philco Corporation, Philadelphia, Pa., a corporation of Pennsylvania Application June 2, 1949, Serial No. 96,770

1 Claim. (Cl. 220—17)

The invention hereinafter disclosed and claimed relates to the storage of foodstuffs or other substances and, more particularly, is concerned with cabinet structures within which may be removably disposed receptacles adapted to contain stored substances.

While, in its broader aspects, the apparatus of the invention may be used for a wide variety of storage purposes, the concepts of the invention are of particular utility as applied to the packing and storage of frozen foods in a refrigerated chest of the top-access type. Accordingly, and for exemplary purposes, the following description and the accompanying drawings disclose the apparatus of the invention as embodied in a household freezer chest of known type.

It is the primary object of this invention to provide a top access storage cabinet which includes receptacle means readily insertable within and withdrawable from said cabinet, and in which there is afforded a high degree of flexibility respecting the positions which the receptacle means may occupy within the cabinet structure.

To these general ends, the invention utilizes open-topped cabinets of known type in novel combination with one or more receptacles having handle means adapted to engage the cabinet and thus suspend the receptacle therein. Further, the receptacles are provided with wall portions configured to cooperate with the cabinet structure and thus provide additional support for said receptacles. It is also a feature of the apparatus that the receptacles may be so oriented with respect to the cabinet, and introduced therewithin, that the said portions are not effective to provide the stated support, and receptacles thus oriented may then be disposed within the lower portion of the cabinet and supported, for example, upon the floor thereof.

It is also an object of my invention to provide a novel receptacle of generally utility and particularly adapted for the stated purposes.

The foregoing, together with other objects and constructional features of the invention, will be best understood by making reference to the following detailed description, considered in the light of the accompanying drawings, in which:

Figure 1 is a view, in perspective, of a freezer chest of the household type, the view showing receptacles disposed and supported at various locations therein;

Figure 2 is a perspective view, on a larger scale, illustrating a preferred form of receptacle, fragmentary parts of the cabinet also appearing in the view;

Figure 4:
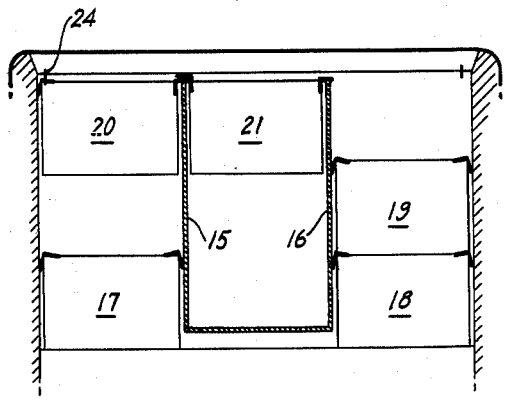
Figure 4 is a diagrammatic view illustrative of the positions which the receptacles may occupy within the cabinet, and of the various modes of support; and, Figure 5 is a fragmentary, somewhat diagrammatic view showing a constructional feature of the apparatus of this invention.

Now making more detailed reference to the drawings and, initially, to Figures 1, 2 and 4 thereof, it will be seen that the freezer chest to which the concepts of this invention are most applicable, comprises vertically extending front and back walls 10 and 11, respectively, and a pair of vertically extending lateral walls 12 and 13. The cabinet is provided with a lid, or closure member, illustrated fragmentarily at 14, and arranged within the cabinet are a pair of vertically extending partitions 15 and 16 which serve to divide the cabinet into a pair of laterally disposed sub-compartments and a center section. As will be understood, other compartmental arrangements may be utilized without departing from the essential concepts of this invention.

As appears to best advantage in Figure 4, the invention contemplates provision for removably supporting receptacles in a number of different locations within the cabinet. As shown in that figure, the two receptacles which occupy locations designated 17 and 18, have been lowered the full depth of the cabinet and rest upon the floor thereof, receptacle 19 occupies an intermediate position in which it is carried by the upper portion of receptacle 18, and receptacles 20 and 21 occupy upper positions within the cabinet, and are supported upon the upwardly presented edges of the walls which enclose the cabinet and upon the two partitions disposed therein.

It is a feature of the invention that the receptacles may be identical in nature, and it is particularly to be noted that each is novelly cooperable with the cabinet structure in a variety of ways accommodating disposition thereof in any of the positions illustrated in Figure 4.

In general, and with reference to the support of receptacles in upper positions in the cabinet, the invention provides two different means or modes of support. Firstly, each receptacle is provided with a pair of handles at least one of which handles is associated with the upper edge of one of the aforesaid partitions. A pair of these handles is shown in detail at 22 and 23 in Figure 2, and as will be plain from consideration of receptacle 21, as shown in Figure 4, two handles, in cooperation with the partitions 15 and 16, provide the sole support for a receptacle disposed in the upper portion of the cabinet and arranged intermediate said partitions. The manner in which the handles are constructed, and the way in which they are used, will be more fully described hereinafter.

In addition to the handles aforesaid, each corner of the cabinet structure is provided with a hanger element, or hook, disposed at the level of the upwardly presented edges of partitions 15 and 16. A pair of these hanger elements is illustrated at 24 and 25, in Figure 1, and one thereof appears at 24 in each of Figures 2 and 4. As clearly illustrated in Figures 1 and 4, both the hooks and the above-mentioned handles are utilized to provide support for a receptacle disposed in the upper part of either of the two laterally arranged compartments provided in the cabinet.

Figure 3:
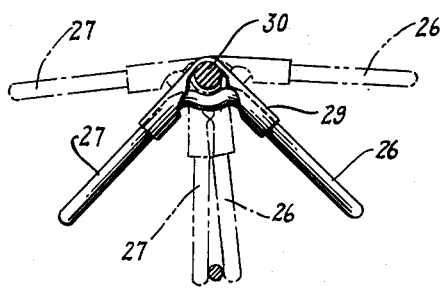
Figure 3 is a fragmentary, elevational view, illustrative of a combined receptacle handle and support means of the type contemplated by the invention.

Now making more detailed reference to the construction of the handles, and to the manner in which they are used, it will be seen from Figure 3 that each handle may conveniently comprise a pair of wire loops shown at 26 and 27 (see also Figure 2), which loops lie in substantially right-angularly related planes. Intermediate portions 28 and 29 of the handle structure may, as shown, be composed of an angle or elbow of tubing adapted to provide support for the wire loops and having an aperture therein through the agency of which the complete handle is pivotally secured to the top framing element 30 of the receptacle. As will be understood from either of Figures 2 or 3, if the wire loop 26 of handle 23 be grasped and utilized in lifting the receptacle into a position from which it may be lowered within the cabinet, said loop 26 will, by virtue of the pivots provided at 28 and 29, move to a position from which it extends outwardly of the receptacle. The oppositely disposed wire loop 27, on the other hand, will be rotated downwardly within the basket or receptacle until it bears against the wires or other means which comprise the surface of the adjacent side wall of the receptacle. The normal position of the handle in the absence of a lifting force is illustrated in full lines in Figure 3, whereas the two operative positions thereof are shown in broken lines, one of said positions (the position in which loop 26 is raised) appearing in double dot representation, and the other operative position appearing in single dot representation.

When it is desired to dispose the receptacle in the position shown at 21, in Figure 4, what may be referred to as the "outboard" wire loop of each handle (see for example loop 26) is grasped, thereby moving the handles into the outwardly extending position in which handle 23 is shown in Figure 2. In this position the handles may extend across and make contact with the upwardly presented edges of partitions 15 and 16, and thus securely support the receptacle in the position shown at 21. The handles may take other forms within the purview of the invention. Flat sheet material may, for example, be resorted to.

When it is desired to dispose one or more of the receptacles in lower positions within the cabinet, in which connection reference should be had to the positions shown at 17 and 18 in Figure 4, the "inboard" loop of each handle is grasped, thereby rotating that loop upwardly until it extends inwardly of the open top of the receptacle, such rotative movement serving to swing the loop 26 downwardly about the above-mentioned pivots, until said loop lies closely adjacent the exterior of the members or surfaces which compose the walls of the receptacle (see the single dot representation of Figure 3). When the handle has been so manipulated, the receptacle may readily be moved downwardly within the cabinet, it being understood that it is most advantageous to employ receptacles which are of a size to be snugly received within the cabinet compartments. When the handles are in the positions just described it will be apparent, without further description, that any receptacle (for example, receptacle 19, Figure 4) may be disposed upon and supported by another underlying receptacle.

As indicated, supra, the hooks or hangers aforesaid serve, in cooperation with one handle element, to support a receptacle placed in the position illustrated at 20 in Fig. 4. To accommodate such support, and in accordance with a particular feature of this invention, receptacles intended for disposition in such a location have a pair of adjacent corner sections (for example, the sections shown at 31 and 32 in Figure 2) of right-angular configuration, as viewed in plan.

When it is desired to support a receptacle in the last-mentioned location, the outboard loop of that handle which is arranged opposite to sections 31 and 32 is rotated upwardly into a position in which it may overlie the top edge of partition 15. Following this, the receptacle is oriented, with respect to the cabinet, in such a way that the said right-angular corner sections 31 and 32 are adjacent to and may be engaged by the hanger elements 24, when the receptacle is lowered into position.

Figure 5:
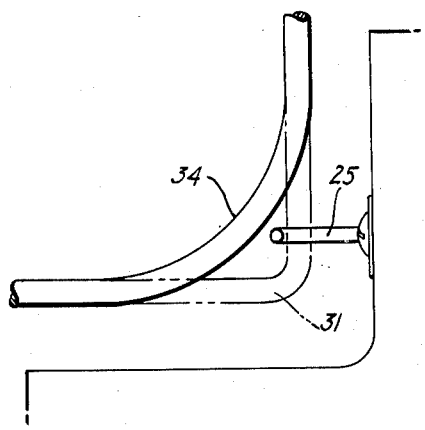

Each receptacle is further provided with a pair of adjacent corner sections 33 and 34 (Figure 2) which are arcuately curved, in order that said corner sections shall not extend outwardly a distance sufficient to permit engagement by the hooks 24, as clearly appears from Figure 5.

As will now be understood, when it is desired to lower a receptacle into the bottom of the cabinet, said receptacle is so oriented that the arcuately curved corner sections 33 and 34 confront the hangers 24. Since, as above set forth, said arcuately curved sections do not extend outwardly a distance sufficient to engage the hooks, it is possible to lower the receptacle into the bottom of the cabinet, past the hooks 24, after suitably manipulating the handles thereof.

From the foregoing description, the convenience afforded by the inexpensive, yet advantageous apparatus of this invention will be appreciated. In packing within the receptacles food or other substances to be stored, it is, of course, most convenient to place the receptacle upon a table or other surface readily at hand. When the packing operation has been completed, placement and support of the several receptacles within the cabinet requires only that the receptacles be oriented and the handles grasped in a manner permitting insertion of the receptacle and support thereof in the desired locations.

Additionally, use of the storage cabinets of the type contemplated herein generally necessitates rather frequent removal and relocation of the contents of the cabinet, and these use factors have hitherto presented substantial problems in the design of top-access chests. The almost unlimited flexibility of arrangement afforded by the apparatus of the present invention is therefore of particular commercial significance.

I claim:

A substantially rectangular open-topped receptacle adapted for selective disposition within a cabinet at various locations therein, said receptacle including a corner portion having substantially right angular configuration when viewed in plan, a corner portion having arcuate configuration when viewed in plan, said arcuate corner portion lying inwardly of the intersection of the planes which contain the adjacent walls of the receptacle, and at least one handle element associated with a wall of the receptacle in a region spaced across the receptacle from said corner portion of right angular configuration, said handle element having a pair of arm portions extending in generally right-angular relation with respect to one another and straddling said wall so that one of said arm portions lies inwardly of said receptacle and the other lies outwardly thereof, said handle element further having an intermediate portion joining said arm portions and being pivotally secured to the said wall of the receptacle, said handle element being rockable upon said wall between a position in which the said other arm portion lies closely adjacent the outside surface of said wall and a position in which it extends laterally from said outside surface.

JOHN H. PFEIFFER.

References Cited in the file of this patent

UNITED STATES PATENTS

| Number | Name | Date |
|---|---|---|
| 1,048,862 | Nesbitt | Dec. 31, 1912 |
| 1,653,489 | Ziola | Dec. 20, 1927 |
| 1,763,174 | Morris | June 10, 1930 |
| 1,774,312 | Braeutigam | Aug. 26, 1930 |
| 1,804,099 | Hazy | May 5, 1931 |
| 2,057,036 | Korinsky | Oct. 13, 1936 |
| 2,133,770 | McGlohon | Oct. 18, 1938 |
| 2,364,073 | Howard | Dec. 5, 1944 |
| 2,420,277 | Wulstein | May 6, 1947 |
| 2,486,932 | Elliott | Nov. 1, 1949 |